(12) United States Patent
Yoshida

(10) Patent No.: US 7,718,761 B2
(45) Date of Patent: May 18, 2010

(54) HEAT TREATMENT METHOD OF THERMOPLASTIC RESIN FILM AND APPARATUS THEREOF

(75) Inventor: Tetsuya Yoshida, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/057,879

(22) Filed: Mar. 28, 2008

(65) Prior Publication Data

US 2008/0242824 A1    Oct. 2, 2008

(30) Foreign Application Priority Data

Mar. 28, 2007    (JP) .............................. 2007-085824

(51) Int. Cl.
*C08F 6/00*    (2006.01)
*C08G 63/00*    (2006.01)
(52) U.S. Cl. ........................ 528/480; 264/291; 425/135; 428/220; 527/314
(58) Field of Classification Search ................. 264/291; 425/135; 428/220; 527/314
See application file for complete search history.

(56) References Cited

U.S. PATENT DOCUMENTS 5,674,442 A    10/1997    Morita

FOREIGN PATENT DOCUMENTS

| EP | 0687545 | A1 |   | 12/1995 |
| JP | 61106776 |    | * | 11/1987 |
| JP | 6166089 | A |   | 6/1994 |
| JP | 8244051 | A |   | 9/1996 |
| JP | 2006414443 |    | * | 12/2006 |
| WO | 9518004 | A1 |   | 7/1995 |

* cited by examiner

*Primary Examiner*—Terressa M Boykin
(74) *Attorney, Agent, or Firm*—Sughrue Mion, PLLC

(57) ABSTRACT

An aspect of the invention provides a heat treatment method of a thermoplastic resin film comprising running a strip shaped thermoplastic resin film in a longitudinal direction and heating the thermoplastic resin film while holding the edge of the film in a width direction to conduct a heat treatment, wherein a tension of the thermoplastic resin film in the width direction is controlled to be constant. According to the aspect of the invention, since a thermoplastic resin film during a heat treatment is held with a constant tension in a width direction, the thermoplastic resin film during the heat treatment can be prevented from sagging or pulling excessively. Therefore, occurrence of variability of optical characteristics can be prevented, and thus a thermoplastic resin film excellent in optical characteristics can be produced.

4 Claims, 9 Drawing Sheets

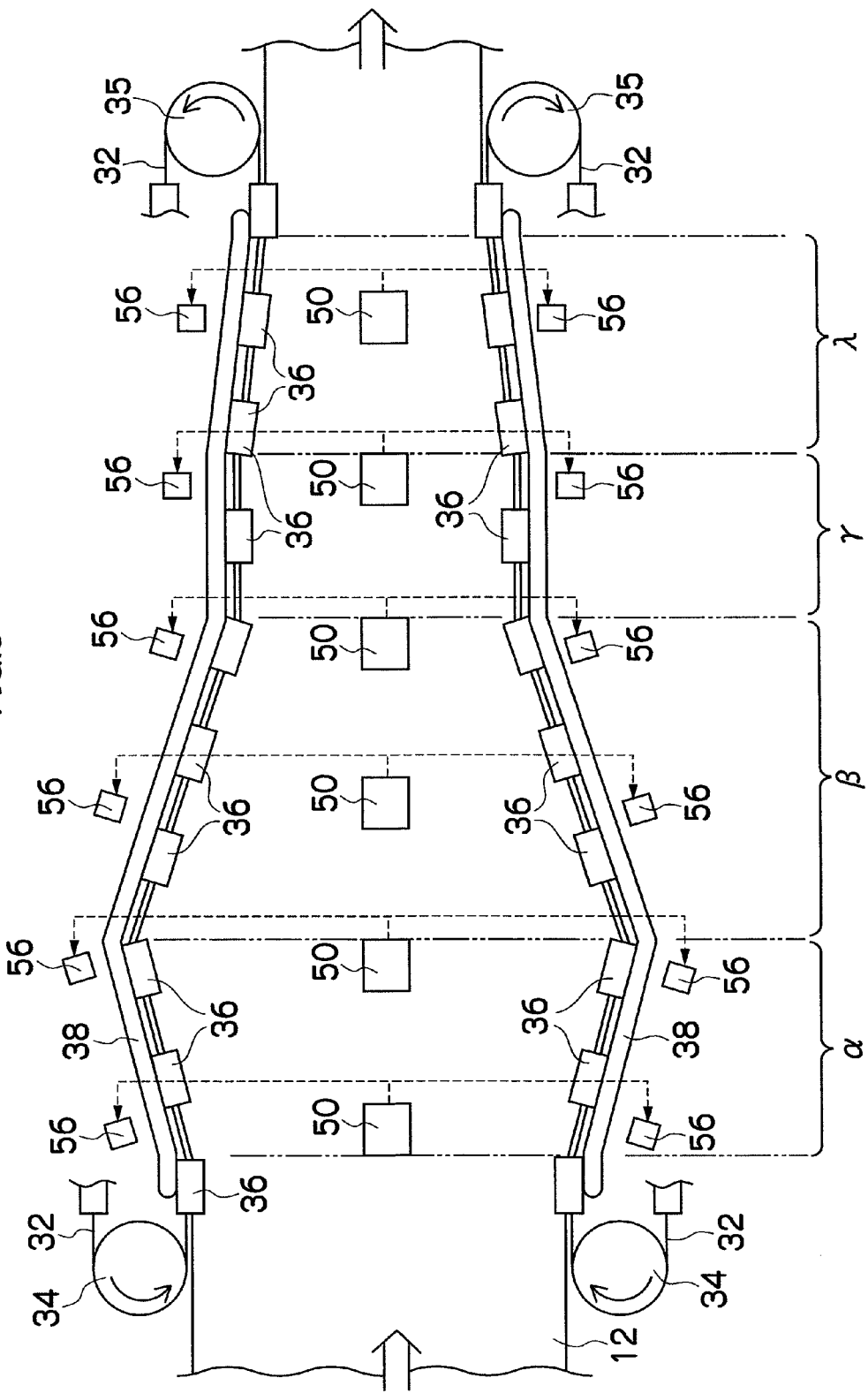

FIG.9

| | MAXIMUM HEAT TREATMENT TEMPERATURE | FILM TENSION ADJUSTMENT | TEMPERATURE INCREASING RATE | FILM QUALITY | | |
|---|---|---|---|---|---|---|
| | | | | VARIABILITY OF OPTICAL CHARACTERISTICS IN WIDTH DIRECTION | BOWING | SURFACE STATE |
| EXAMPLE 1 | 240°C | (a) | 100°C/min | VERY GOOD | VERY GOOD | VERY GOOD |
| EXAMPLE 2 | 240°C | (a) | 200°C/min | VERY GOOD | GOOD | VERY GOOD |
| EXAMPLE 3 | 240°C | (a) | 40°C/min | VERY GOOD | VERY GOOD | VERY GOOD |
| EXAMPLE 4 | 135°C | (a) | 100°C/min | VERY GOOD | VERY GOOD | VERY GOOD |
| COMPARATIVE EXAMPLE 1 | 240°C | (b) | 100°C/min | POOR | POOR | VERY GOOD |
| COMPARATIVE EXAMPLE 2 | 240°C | (b) | 100°C/min | POOR | NORMAL | POOR |
| COMPARATIVE EXAMPLE 3 | 135°C | (c) | 100°C/min | GOOD | NORMAL | GOOD |

HEAT TREATMENT METHOD OF THERMOPLASTIC RESIN FILM AND APPARATUS THEREOF

BACKGROUND OF THE INVENTION

1. Field of the Invention

The present invention relates to a heat treatment method of a thermoplastic resin film and an apparatus thereof, and particularly a heat treatment method of a thermoplastic resin film such as a cellulose acylate film used as a retardation film in a liquid crystal display device, and an apparatus thereof.

2. Description of the Related Art

Uses of a cellulose acylate film have been enlarged as an optical film for an image display device, typically, such as a liquid crystal display device and an organic EL display device in view of transparency, rigidity and optical isotropy thereof. An optical film for a liquid crystal display device is used as a retardation film by stretching the film to exhibit in-plane retardation (Re) and thickness direction retardation (Rth), other than as a protective film for a polarizing plate.

In a production process of a thermoplastic resin film such as a cellulose acylate film, there may be a case where a heat treatment is carried out while holding the both edges of the film in a width direction. For example, in case of film formation by a solution film formation method, in a drying step for volatilizing a solvent, a film is dried by heating while holding the both edges of the film in a width direction. When a film is transversely stretched in a width direction, the film is stretched in a width direction at a specified heating temperature while holding the both edges of the film in the width direction. Further, when a film is crystallized, crystallization is promoted by heating while holding the both edges of the film in the width direction (for example, see Japanese Patent Application Laid-Open Nos. 6-166089 and 8-244051).

SUMMARY OF THE INVENTION

However, in conventional heat treatment methods, when the both edges of a film are held, tension is given to the film more than necessity and thus variability of optical characteristics was caused in the film, or on the contrary, the edges of a film are not sufficiently held and the center of the film is sagged so that variability of optical characteristics of the film was caused.

The present invention has been achieved in view of such circumstances, and an object of the invention is to provide a heat treatment method of a thermoplastic resin film, and an apparatus thereof, which can prevent occurrence of variability of optical characteristics.

In order to achieve the above described object, a first aspect of the invention provides a heat treatment method of a thermoplastic resin film, comprising: running a strip shaped thermoplastic resin film in a longitudinal direction; and heating the thermoplastic resin film while holding edges of the film in a width direction to conduct a heat treatment, wherein a tension of the thermoplastic resin film in the width direction is controlled to be constant.

According to the first aspect of the invention, since a thermoplastic resin film during a heat treatment is held with a constant tension in a width direction, the thermoplastic resin film during the heat treatment can be prevented from sagging or pulling excessively. Therefore, according to the first aspect of the invention, occurrence of variability of optical characteristics can be prevented, and thus a thermoplastic resin film excellent in optical characteristics can be produced.

In order to achieve the above described object, a second aspect of the invention provides a heat treatment method of a thermoplastic resin film, comprising: running a strip shaped thermoplastic resin film in a longitudinal direction; and heating the thermoplastic resin film in a state that both edges of the film in a width direction are held with holding members to conduct a heat treatment, wherein a distance between the holding members is changed depending on an expansion/contraction amount of the thermoplastic resin film in the width direction.

According to the second aspect of the invention, since a distance between the holding members is changed depending on an expansion/contraction amount of the thermoplastic resin film, a thermoplastic resin film during a heat treatment can be prevented from sagging, and the edges of the thermoplastic resin film during the heat treatment can be prevented from being pulled excessively by the holding members. Thereby, the second aspect of the invention can prevent occurrence of variability of optical characteristics by a heat treatment, and thus a thermoplastic resin film excellent in optical characteristics can be produced.

A third aspect of the invention is characterized in that according to the first and second aspects, when a glass transition temperature of the thermoplastic resin film is $Tg(°C.)$, and a melting point of the thermoplastic resin film is $Tm$ $(°C.)$, a maximum temperature $Tmax$ $(°C.)$ of the thermoplastic resin film in the heat treatment satisfies $Tg \leq Tmax < Tm$. The present invention is particularly effective when a maximum temperature of a thermoplastic resin film is the glass transition temperature or more and the melting point or less as the third aspect.

A fourth aspect of the invention is characterized in that according to any one of the first to third aspects, a temperature increasing rate to reach the maximum temperature $Tmax$ $(°C.)$ of the thermoplastic resin film is 50 $(°C./min)$ or more and $(150° C./min)$ or less. According to the fourth aspect of the invention, since a temperature of the thermoplastic resin film gently increases, the thermoplastic resin film can be prevented from causing bowing. Bowing can be prevented at a temperature increasing rate of 50 $(°C./min)$ or less, but it is not preferable from the viewpoint of productivity. In addition, bowing refers to a phenomenon in which a straight line drawn along the width direction of the film is changed into a concave shape after treatment, and by preventing this bowing, a film having uniform optical characteristics can be obtained.

A fifth aspect of the invention is characterized in that according to any one of the first to fourth aspects of the invention, the thermoplastic resin film is a cellulose acylate film.

In order to achieve the above described object, a sixth aspect of the invention provides a heat treatment apparatus of a thermoplastic resin film which performs heat treatment by running a strip shaped thermoplastic resin film in a longitudinal direction, and heating the thermoplastic resin film in a state that both edges of the film in a width direction are held with holding members, the heat treatment apparatus comprising: a tension detecting device which detects a tension state of the thermoplastic resin film in the width direction; and a holding member transfer device which transfers the holding members in the width direction of the thermoplastic resin film according to a detection result obtained from the tension detecting device.

A seventh aspect of the invention is characterized in that according to the sixth aspect of the invention, the tension detecting device detects the tension state by measuring a height position of a center of the thermoplastic resin film in the width direction.

According to the present invention, since a thermoplastic resin film during a heat treatment is held with a constant tension in a width direction, and a distance between holding members is changed depending on an expansion/contraction amount of the thermoplastic resin film, variability of optical characteristics caused by the heat treatment can be prevented, and thus a thermoplastic resin film excellent in optical characteristics can be produced.

BRIEF DESCRIPTION OF THE DRAWINGS

FIG. 8 is a plan view showing the heat treatment unit using the clip in FIG. 7; and FIG. 9 is a table showing results of Examples.

DETAILED DESCRIPTION OF THE PREFERRED EMBODIMENTS

Figure 1:
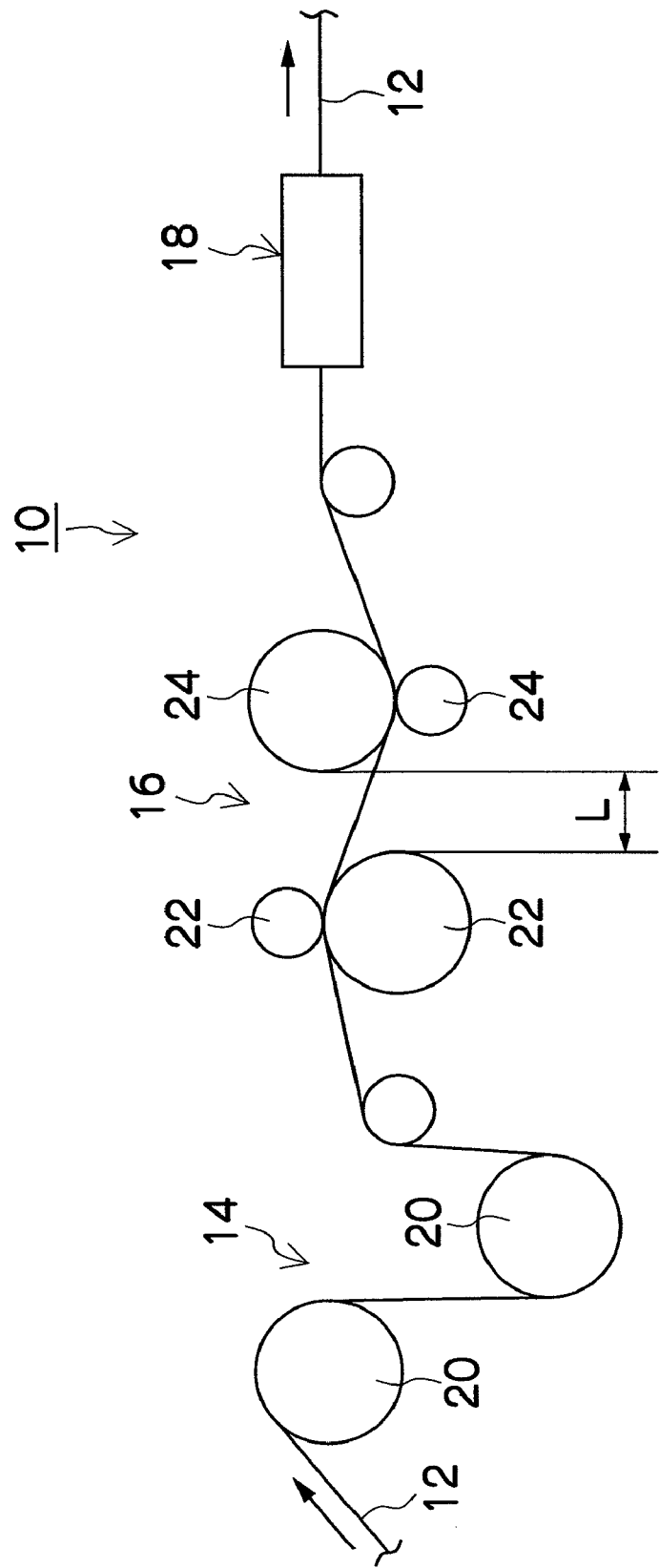
FIG. 1 is a view showing a schematic configuration of a stretching and heat treatment apparatus to which the present invention is applied.

Preferred embodiments of the heat treatment method of a thermoplastic resin film and the apparatus thereof according to the present invention will be described in the following. Description for constituent features described hereinafter is made by typical embodiments of the present invention, but the invention is not limited to these embodiments. In addition, a numerical range expressed by using "–" indicates a range that includes numerical values described before and after "–".

<<Cellulose Acylate Film>>

[Moisture Permeability]

A cellulose acylate film of the present invention has a moisture permeability of 100-400 g/($m^2$·day) at 40° C. and a relative humidity of 90%, and a moisture permeability change after retaining for 1000 hours at 60° C. and a relative humidity of 95% is preferably—100 g/($m^2$·day)-10 g/($m^2$·day). The "moisture permeability" refers to a mass change (g/($m^2$·day)) before and after retaining a whole cellulose acylate film, with which a cap containing calcium chloride is covered, contained in a sealed vessel for 24 hours under the conditions of 40° C. and a relative humidity of 90%. The moisture permeability increases along with temperature increase and it also increases along with humidity increase, and in the case of employing any temperature and humidity, a magnitude relationship of the moisture permeability among films is constant. Therefore, the present invention employs a value of the above described mass change at 40° C. and a relative humidity of 90% as a base.

A moisture permeability of the cellulose acylate film of the present invention is preferably 100-400 g/($m^2$·day), more preferably 120-350 g/($m^2$·day), and further more preferably 150-300 g/($m^2$·day).

A moisture permeability before and after retaining a film for 1000 hours at 60° C. and a relative humidity of 95% is measured according to the above described method, and a value obtained by subtracting a moisture permeability before retaining from a moisture permeability after retaining is defined to be "moisture permeability change after retaining for 1000 hours at 60° C. and a relative humidity of 95%". A moisture permeability change after retaining the cellulose acylate film of the present invention for 1000 hours at 60° C. and a relative humidity of 95% is —100 g/($m^2$·day)-10 g/($m^2$·day), preferably—50 g/($m^2$·day)-5 g/($m^2$·day), and more preferably—20 g/($m^2$·day)-0 g/($m^2$·day).

Further, since a moisture permeability decreases along with increase of a film thickness and increases along with decrease of the film thickness, in the present invention, a value obtained by multiplying a measured moisture permeability by a measured film thickness and then dividing it by 80 is defined to be "a moisture permeability in terms of a film thickness of 80 µm". A moisture permeability of the cellulose acylate film of the present invention in terms of a film thickness of 80 µm is preferably 100-420 g/($m^2$·day), more preferably 150-400 g/($m^2$·day), and further more preferably 180-350 g/($m^2$·day).

When using a cellulose acylate film satisfying such conditions regarding the moisture permeability as described above, a polarizing plate excellent in durability for humidity or heat humidity, and a liquid crystal display device having high reliability can be provided.

[Cellulose Acylate]

The cellulose acylate film of the present invention is made of cellulose acylate as a main polymer component. Herein, when the film is made of a single polymer, the "main polymer component" indicates the single polymer, and when the film is made of a plurality of polymers, the "main polymer component" indicates a polymer contained at the highest mass ratio among constituting polymers.

As cellulose acylate used when the cellulose acylate film of the present invention is produced, powdered or granulate cellulose acylate can be used, and palletized cellulose acylate can be also used. A moisture content of cellulose acylate is preferably 1.0% by mass or less, more preferably 0.7% by mass or less, and most preferably 0.5% by mass or less. Optionally, the moisture content is preferably 0.2% by mass or less. When the moisture content of cellulose acylate does not fall within the preferable ranges, it is preferred to use after drying by heating, etc. These polymers may be used alone or two kinds or more of these polymers may be used in combination.

Examples of the above described cellulose acylate include a cellulose acylate compound, and a compound having an acyl-substituted cellulose skeleton obtained by biologically or chemically introducing a functional group, which is made of cellulose as a material.

The cellulose acylate is an ester of cellulose and carboxylic acid. The carboxylic acid constituting the ester is preferably fatty acid having 2 to 22 carbon atoms, and most preferably lower fatty acid having 2 to 4 carbon atoms.

In the cellulose acylate, whole or a part of hydrogen atoms in hydroxyl groups existing at 2nd, 3rd, and 6th positions in a glucose unit constituting cellulose are substituted with acyl group. Examples of the acyl group include acetyl group, propionyl group, butyryl group, isobutyryl group, pivaloyl group, heptanoyl group, hexanoyl group, octanoyl group, decanoyl group, dodecanoyl group, tridecanoyl group, tetradecanoyl group, hexadecanoyl group, octadecanoyl group, cyclohexanecarponyl group, oleoyl group, benzoyl group, naphthylcarbonyl group, and cinnamoyl group. The acyl group is preferably acetyl group, propionyl group, butyryl group, dodecanoyl group, octadecanoyl group, pivaloyl group, oleoyl group, benzoyl group, naphthylcarbonyl group, or cinnamoyl group, and most preferably acetyl group, propionyl group, or butyryl group.

Cellulose acylate may be substituted with a plurality of acyl groups, and specific examples include cellulose acetate propionate, cellulose acetate butyrate, cellulose acetate butyrate propionate, and cellulose butyrate propionate.

Cellulose acylate constituting the cellulose acylate film of the present invention is particularly preferably cellulose acetate having an ester with acetic acid, more preferably cellulose acetate having an acetyl substitution degree of 2.70 to 2.87 from the viewpoint of solubility into a solvent, and most preferably cellulose acetate having an acetyl substitution degree of 2.80 to 2.86. The substitution degree mentioned herein represents a degree of substituting hydrogen atoms in hydroxyl groups existing at 2nd, 3rd and 6th positions of a glucose unit constituting cellulose, and a substitution degree is 3 when hydrogen atoms in hydroxyl groups existing at 2nd, 3rd and 6th positions are substituted.

Regarding a synthesis method of cellulose acylate, the basic principle is described in "Chemistry of Wood Material" by Nakahiko Migita et al., pp. 80 to 190 (KYORITSU SHUPPAN CO., LTD, 1968). An example of a typical synthesis method of cellulose acylate is a liquid phase acylation method by a carboxylic anhydride-carboxylic acid-sulfinuric acid catalyst. Specifically, cellulose materials such as cotton linter and wood pulp are first pre-treated with a suitable amount of carboxylic acid such as acetic acid, then the resultant is charged in an acylated mixed solution cooled in advance to be esterified, and complete cellulose acylate (a total degree of acyl substitution at 2nd, 3rd and 6th positions is 3.00) is synthesized. The above described acylated mixed solution generally contains carboxylic acid as a solvent, carboxylic anhydride as an esterifying agent and sulfuric acid as a catalyst. Further, the carboxylic anhydride is usually used in a stoichiometrically excess amount more than a total amount of cellulose reacting with the carboxylic anhydride and a water content present in the system.

Then, after completion of an acylation reaction, in order to perform hydrolysis of excess carboxylic anhydride remaining in the system, water or water-containing acetic acid is added. Further, in order to neutralize a part of an esterifying catalyst, an aqueous solution containing a neutralizer (for example, carbonate salt, acetate salt, hydroxide or oxide of calcium, magnesium, iron, aluminum or zinc) may be added. The obtained complete cellulose acylate is kept at 20° C. to 90° C. in the presence of a small amount of an acylation reaction catalyst (in general, remaining sulfuric acid) and thereby saponified and heated, and changed into cellulose acylate having a desired acyl substitution degree and a desired polymerization degree. At the time of obtaining a desired cellulose acylate, the catalyst remaining in the system is completely neutralized with the above described neutralizer, etc., or without neutralizing the catalyst, a cellulose acylate solution is charged into water or diluted acetic acid (alternatively, water or diluted acetic acid is charged in a cellulose acylate solution) to separate cellulose acylate, and the targeted cellulose acylate can be obtained by washing and a stabilization treatment.

A polymerization degree of the cellulose acylate is preferably 150-500 as a viscosity average polymerization degree, more preferably 200-400, and further more preferably 220-350. The viscosity average polymerization degree can be measured in accordance with description for a limiting viscosity method by Uda et al. (Kazuo Uda and Hideo Saito, Journal of the Society of Fiber Science and Technology, Vol. 18, No. 1, pp. 105 to 120, 1962). A measuring method of the viscosity average polymerization degree is also described in Japanese Patent Application Laid-Open No. 9-95538.

Cellulose acylate having a small amount of low molecular weight components has a high average molecular weight (polymerization degree), but a value of viscosity thereof is lower than that of general cellulose acylate. Such cellulose acylate having a small amount of low molecular weight components can be obtained by removing the low molecular weight components from cellulose acylate synthesized by a general method. The removal of the low molecular weight components can be preformed by washing cellulose acylate with a suitable organic solvent. Cellulose acylate with a small amount of low molecular weight components can be obtained by synthesis. When cellulose acylate with a small amount of low molecular weight components is synthesized, preferably, an amount of a sulfuric acid catalyst in an acylation reaction is adjusted to 0.5-25 parts by mass based on 100 parts by mass of cellulose. If an amount of the sulfuric acid catalyst is set within the above described range, cellulose acylate which is preferred in the viewpoint of molecular weight distribution (with uniform molecular weight distribution) can be synthesized. Material cotton of cellulose ester and a synthesis method thereof are described in journal of technical disclosure by the Japan Institute of Invention and Innovation (technical disclosure No. 2001-1745, issued on Mar. 15, 2001, Japan Institute of Invention and Innovation) on pp. 7 to 12.

<<Production of Cellulose Acylate Film>>

The cellulose acylate film of the present invention can be produced by a solution flow casting film formation method from a solution containing cellulose acylate and various additives. The solution flow casting film formation method will be described in detail in the following.

When a melting point of the cellulose acylate of the present invention or a melting point of a mixture of the cellulose acylate and various additives is lower than a decomposition temperature of these and higher than a stretching temperature, the cellulose acylate film can be also produced by forming a film by a fusion film formation method. The fusion film formation method is described in Japanese Patent Application Laid-Open No. 2000-352620, etc.

[Cellulose Acylate Solution]

(Solvent)

When the cellulose acylate film of the present invention is produced by the solution flow casting film formation method, a cellulose acylate solution is prepared. As a main solvent for the cellulose acylate solution used in this method, an organic solvent that is a good solvent for the cellulose acylate can be preferably used. As such an organic solvent, an organic solvent having a boiling point of 80° C. or less is more preferable from the viewpoint of reduction of load by drying. A boiling point of the organic solvent is more preferably 10° C. to 80° C., and particularly preferably 20° C. to 60° C. Further, optionally, an organic solvent having a boiling point of 30° C. to 45° C. can be also preferably used as the main solvent.

Examples of such a main solvent include halogenated hydrogen carbide, ester, ketone, ether, alcohol and hydrogen carbide, and these may have a branch structure or a ring structure. The main solvent may have two or more of functional groups of ester, ketone, ether and alcohol (that is, —O—, —CO—, —COO—, and —OH). Hydrogen atoms in a hydrogen carbide moiety of the ester, ketone, ether and alcohol may be substituted with halogen atoms (particularly, fluorine atom). When the main solvent is made of a single solvent, the main solvent of cellulose acylate used for production of the cellulose acylate film of the present invention indicates the single solvent, and when made of a plurality of solvents, the main solvent indicates a solvent contained at the highest mass ratio among the constituting solvents.

As the halogenated hydrogen carbide, chlorinated hydrogen carbide is preferable, examples thereof include dichloromethane and chloroform, and dichloromethane is more preferable. Examples of the ester include methyl formate, ethyl formate, methyl acetate, and ethyl acetate. Examples of the ketone include acetone, and methyl ethyl ketone.

Examples of the ether include diethyl ether, methyl-tert-butyl ether, diisopropyl ether, dimethoxymethane, 1,3-dioxolan, 4-methyldioxolan, tetrahydrofuran, methyl tetrahydrofuran, and 1,4-dioxane. Examples of the alcohol include methanol, ethanol, and 2-propanol. Examples of the hydrogen carbide include n-pentane, cyclohexane, n-hexane, benzene, and toluene.

Examples of an organic solvent used together with these main solvents include halogenated hydrogen carbide, ester, ketone, ether, alcohol and hydrogen carbide, and these may have a branch structure or a ring structure. The organic solvent may have two or more of functional groups of ester, ketone, ether and alcohol (that is, —O—, —CO—, —COO—, and —OH). Hydrogen atoms in a hydrogen carbide moiety of the ester, ketone, ether and alcohol may be substituted with halogen atoms (particularly, fluorine atom).

As the halogenated hydrogen carbide, chlorinated hydrogen carbide is preferable, examples thereof include dichloromethane and chloroform, and dichloromethane is more preferable. Examples of the ester include methyl formate, ethyl formate, propyl formate, pentyl formate, methyl acetate, ethyl acetate, and pentyl acetate. Examples of the ketone include acetone, methyl ethyl ketone, diethyl ketone, diisopropyl ketone, cyclopentanone, cyclohexanone, and methylcyclohexanone. Examples of the ether include diethyl ether, methyl-tert-butyl ether, diisopropyl ether, dimethoxymethane, dimethoxyethane, 1,4-dioxane, 1,3-dioxolan, 4-methyldioxolan, tetrahydrofuran, methyl tetrahydrofuran, anisole, and phenetole.

Examples of the alcohol include methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol. Examples of the hydrogen carbide include n-pentane, cyclohexane, n-hexane, benzene, toluene, and xylene. Examples of the organic solvent having two or more of functional groups include 2-ethoxyethyl acetate, 2-methoxyethanol, 2-butoxyethanol, and methyl acetoacetate.

The cellulose acylate film of the present invention preferably contains an alcohol in an amount of 5 to 30% by mass in the whole solvent, more preferably 7 to 25% by mass, and further more preferably 10 to 20% by mass from the viewpoint of reduction of load by separating from a band.

Examples of combinations of organic solvents preferably used as solvents for a cellulose acylate solution used in production of the cellulose acylate film of the present invention will be described in the following, but combinations that can be employed in the present invention are not limited thereto. In addition, a value of proportion indicates part by mass.

(1) Dichloromethane/methanol/ethanol/butanol=80/10/5/5

(2) Dichloromethane/methanol/ethanol/butanol=80/5/5/10

(3) Dichloromethane/isobutyl alcohol=90/10

(4) Dichloromethane/acetone/methanol/propanol=80/5/5/10

(5) Dichloromethane/methanol/butanol/cyclohexane=80/8/10/2

(6) Dichloromethane/methyl ethyl ketone/methanol/butanol=80/10/5/5

(7) Dichloromethane/butanol=90/10

(8) Dichloromethane/acetone/methyl ethyl ketone/ethanol/butanol=68/10/10/7/5

(9) Dichloromethane/cyclopentanone/methanol/pentanol=80/2/15/3

(10) Dichloromethane/methyl acetate/ethanol/butanol=70/12/15/3

(11) Dichloromethane/methyl ethyl ketone/methanol/butanol=80/5/5/10

(12) Dichloromethane/methyl ethyl ketone/acetone/methanol/pentanol=50/20/15/5/10

(13) Dichloromethane/1,3-dioxolan/methanol/butanol=70/15/5/10

(14) Dichloromethane/dioxane/acetone/methanol/butanol=75/5/10/5/5

(15) Dichloromethane/acetone/cyclopentanone/ethanol/isobutyl alcohol/cyclohexane=60/18/3/10/7/2

(16) Dichloromethane/methyl ethyl ketone/acetone/isobutyl alcohol=70/10/10/10

(17) Dichloromethane/acetone/ethyl acetate/butanol/hexane=69/10/10/10/1

(18) Dichloromethane/methyl acetate/methanol/isobutyl alcohol=65/15/10/10

(19) Dichloromethane/cyclopentanone/ethanol/butanol=85/7/3/5

(20) Dichloromethane/methanol/butanol=83/15/2

(21) Dichloromethane=100

(22) Acetone/ethanol/butanol=80/15/5

(23) Methyl acetate/acetone/methanol/butanol=75/10/10/5

(24) 1,3-dioxolan=100

Details in the case of using a non-halogen organic solvent as the main solvent is described in journal of technical disclosure by the Japan Institute of Invention and Innovation (technical disclosure No. 2001-1745, issued on Mar. 15, 2001, Japan Institute of Invention and Innovation), and can be suitably applied to the present invention.

(Concentration of Solution)

A concentration of cellulose acylate in the cellulose acylate solution to be prepared is preferably 5 to 40% by mass, more preferably 10 to 30% by mass, and most preferably 15 to 30% by mass. The concentration of the cellulose acylate can be adjusted to a predetermined concentration in the stage of dissolving cellulose acylate into a solvent. Alternatively, a solution with a low concentration (for example, 4 to 14% by mass) is prepared in advance, and then the solution can be concentrated by evaporating a solvent, and the like. Furthermore, a solution with a high concentration is prepared in advance, and then the solution may be diluted. In addition, addition of an additive can decrease the concentration of cellulose acylate.

(Additives)

The cellulose acylate solution used in production of the cellulose acylate film of the present invention can contain various liquid or solid additives according to its uses in respective preparation steps. Examples of the additives include a plasticizer (a preferable amount to be added is 0.01-10% by mass based on cellulose acylate, same as in the following), an ultraviolet absorber (0.001-1% by mass), fine particle powder having an average particle size of 5 to 3000 nm (0.001-1% by mass), a fluorine surfactant (0.001-1% by mass), a peeling agent (0.0001-1% by mass), a deterioration inhibitor (0.0001-1% by mass), an optical anisotropy controlling agent (0.01-10% by mass), and an infrared absorber (0.001-1% by mass).

The above described plasticizer and optical anisotropy controlling agent are organic compounds having a molecular weight of 3000 or less, and are preferably compounds having both of a hydrophobic moiety and a hydrophilic moiety. These compounds are changed in their retardation values by orientating between cellulose acylate chains. Further, these compounds can improve hydrophobicity of a film, and decrease humidity change of retardation. By using the above described ultraviolet absorber and infrared absorber together, wavelength dependency of retardation can be also effectively controlled. It is preferred that the additives used in the cellulose acylate film of the present invention substantially do not sublimate in a drying process.

From the viewpoint of intending reduction of humidity change of retardation, it is preferred that an amount to be added of these additives be large, but as the amount to be added becomes large, problems such as decrease of a glass transition temperature of the cellulose acylate film and sublimation of the additives in the film production step are likely to be caused. Accordingly, when cellulose acylate preferably employed in the present invention is used, an amount to be added of the above described additive having a molecular weight of 3000 or less is preferably 0.01-30% by mass based on the cellulose acylate, more preferably 2-30% by mass, and further more preferably 5-20% by mass.

Plasticizers that can be preferably used in the cellulose acylate film of the present invention are described in Japanese Patent Application Laid-Open No. 2001-151901. Infrared ray absorbers are described in Japanese Patent Application Laid-Open No. 2001-194522. Timing for adding the additives can be suitably determined according to kinds of additives. The additives are also described in journal of technical disclosure by the Japan Institute of Invention and Innovation (technical disclosure No. 2001-1745, issued on Mar. 15, 2001, Japan Institute of Invention and Innovation) on pp. 16 to 22.

(Preparation of Cellulose Acylate Solution)

Preparation of the Cellulose Acylate Solution can be Preformed in Accordance with, for example, a preparation method described in Japanese Patent Application Laid-Open No. 2005-104148 on pp. 106 to 120. Specifically, cellulose acylate and a solvent are mixed and stirred to be swollen, and optionally the mixture is subjected to cooling and heating, etc., to be dissolved, and then the resultant is filtered and a cellulose acylate solution can be obtained.

[Flow Casting and Drying]

The cellulose acylate film of the present invention can be produced by using a conventional solution flow casting film formation device in accordance with a conventional solution flow casting film formation method. Specifically, a dope (a cellulose acylate solution) prepared in a dissolving machine (pot) is once stored in a storage pot after filtration, bubbles contained in the dope are degassed, which allows final preparation. The dope is kept warm at 30° C., it is sent to a pressurized die from a dope discharge outlet through, for example, a pressurized quantitative gear pump that can send a fixed amount of a liquid by a rotational number with high accuracy, and the dope is evenly flow-cast on a metal support in a flow casting part endlessly running from a cap (slit) of the pressurized die (flow casting step). At the peeling point where the metal support nearly once rotates, insufficiently dried dope film (also referred to as web) is peeled from the metal support, subsequently transferred to a drying zone, and drying is completed while transferring the dope wave by a group of rolls. In the present invention, a metal band or a metal belt can be used as the metal support.

Details about the above described flow casting step and drying step are described in Japanese Patent Application Laid-Open No. 2005-104148 on pp. 120 to 146, and can be suitably applied to the present invention.

An amount of a residual solvent in the film after completion of drying is preferably 0-2% by mass, and more preferably 0-1% by mass. After completion of the drying, the film may be directly transferred to a heat treatment zone, or after winding up the film, a heat treatment may be preformed off-line. A width of a cellulose acylate film before the heat treatment is preferably 0.5-5 m, and more preferably 0.7-3 m. When a film is once wound up, a wound-up length is preferably 300-30,000 m, more preferably 500-10,000 m, and further more preferably 1,000-7,000.

[Stretching and Heat Treatment]

Then, a method of longitudinally stretching the obtained cellulose acylate film as described above in a lengthwise direction and contracting the film in a width direction by a heat treatment will be described.

FIG. 1 schematically illustrates a configuration of a stretching and heat treatment apparatus. As shown in the figure, the stretching and heat treatment apparatus 10 is configured with a preheating unit 14 to heat a film 12 in a shape of a strip, a longitudinal stretching unit 16 to stretch the heated film 12 in a longitudinal direction (lengthwise direction), and a heat treatment unit 18 to thermally contract the stretched film 12 in the width direction.

The preheating unit 14 is provided with rollers 20 and 20 capable of adjusting a temperature of surfaces thereof, and by winding the film 12 around these rollers 20 and 20, the film 12 is preheated (heated). The preheated film 12 is transferred to the longitudinal stretching unit 16.

The longitudinal stretching unit 16 is provided with a pair of low speed rollers 22 and 22 and a pair of high speed rollers 24 and 24. The film 12 is pinched by these pairs of rollers 22 and 22 and 24 and 24 and transferred. In this time, the film 12 undergoes longitudinal stretching being stretched in the longitudinal direction (lengthwise direction) due to a gap of speeds between the low speed rollers 22 and the high speed rollers 24.

A non-contact type heating device (not shown in the figure) is provided between the low speed rollers 22 and the high speed rollers 24, the film 12 during stretching is heated by this heating device. A configuration of the heating device is not particularly limited, but examples such as heat air blowing, a far-infrared radiation heater, and a near-infrared radiation heater such as a light-collecting heater can be used. The heating device controls a temperature of the film 12 so as to be (Tg−10° C.) or more and (Tg+50° C.) or less.

A distance L between the low speed roller 22 and the high speed roller 24 is preferably 100 m or more and 500 m or less. When the distance L is less than the above described range, a space for placing the heating device can not be secured. On the other hand, when the distance L is larger than the above described range, only the edges of the film 12 in the width direction contract, and the like, which results in a problem such as causing distribution of optical characteristics in the width direction of the film 12.

The film 12 is stretched in a longitudinal direction (lengthwise direction) by the longitudinal stretching unit 16 configured as described above. In this stretching, preferably, a longitudinal stretch ratio exceeds 1 time and is 2.0 times or less. By longitudinal stretching within such a range, when a heat treatment described later is performed, a retardation film having thickness direction retardation (Rth)/in-plane retardation (Re) of 0.5 or less can be produced. The film 12 longitudinally stretched in the longitudinal stretching unit 16 is sent in the heat treatment unit 18.

A heating oven not shown in the figure is provided in the heat treatment unit 18 and a temperature T of the film 12 is controlled to satisfy $Tg \leq T \leq Tm$. Herein, Tg designates a glass transition temperature, and Tm designates a melting point.

Figure 2:
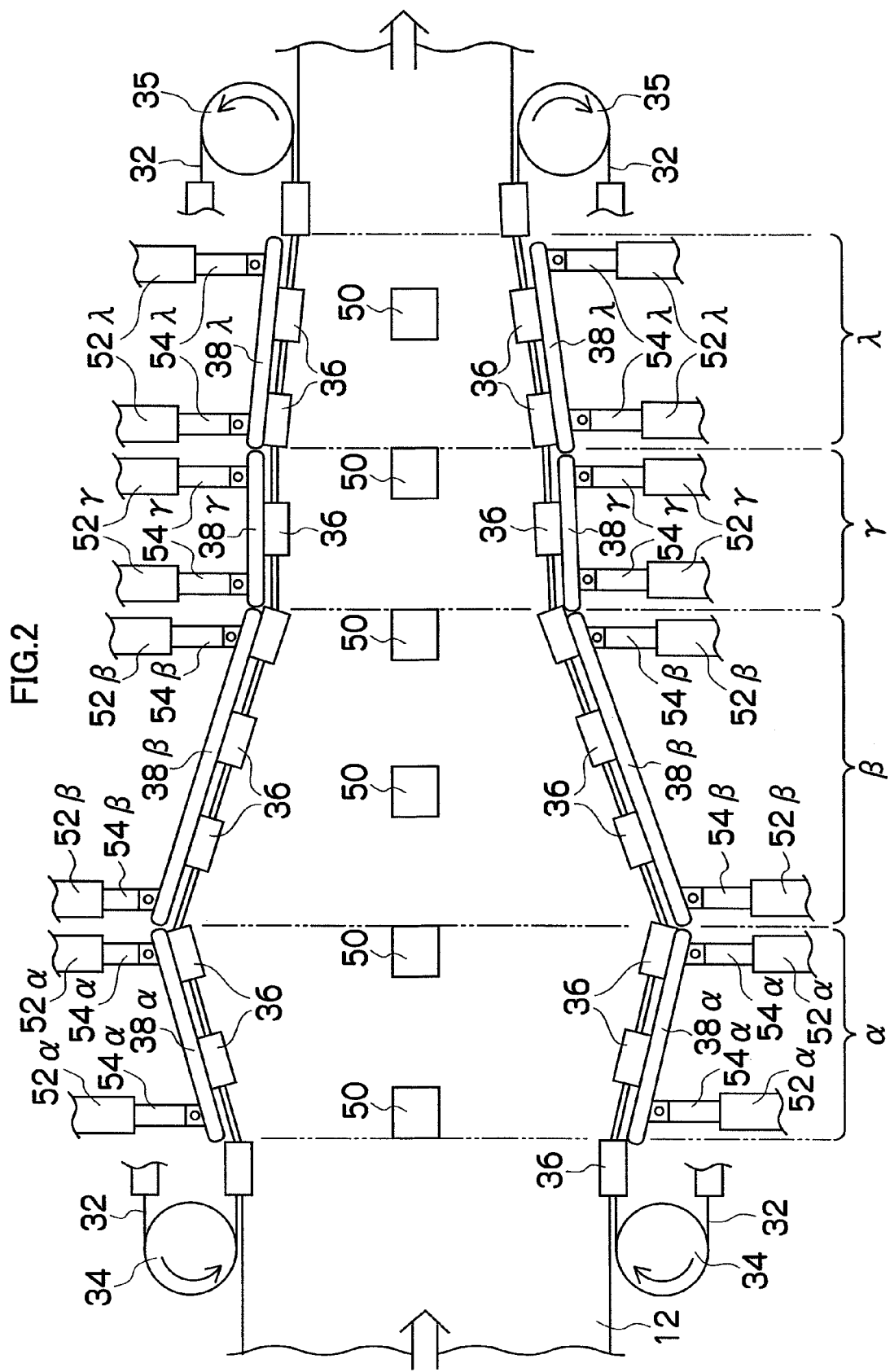
FIG. 2 is a plan view showing a heat treatment unit.

FIG. 2 illustrates a plan view showing a configuration of a heat treatment apparatus forming the heat treatment unit 18. As shown in the figure, the heat treatment apparatus is equipped with a pair of endless chains 32 and 32, these chains 32 and 32 are disposed in both sides of the film 12 in the width direction. These chains 32 are wound around two sprockets 34 and 35, and the chains 32 are run revolvingly by rotating one of the sprockets 34 and 35 with a driving device not shown in the figure.

A plurality of clips 36, 36 . . . are attached to each of the pair of chains 32 at a specified pitch. A clip 36 is a member of holding the edge of the film 12 in the width direction, and it is moved so as to revolve between the sprockets 34 and 35 together with the chains 32. Guide rails $38\alpha$ to $38\lambda$ are provided between the sprockets 34 and 35, and the clips 36 between the sprockets 34 and 35 are guided by the guide rails $38\alpha$ to $38\lambda$.

The guide rails $38\alpha$ to $38\lambda$ are provided in both sides of the film 12 in the width direction, distances among the guide rails $38\alpha$ to $38\lambda$ are configured so as to change from an upstream side to a downstream side in a direction of transferring the film 12. Specifically, the distances are configured to have a part a that is formed so that a distance between the guide rails 38 and 38 becomes slightly larger from the upstream side to the downstream side in the direction of transferring the film 12 (hereinafter, referred to as a heating part), a part $\beta$ that is formed so that the distance becomes gradually smaller (hereinafter, referred to as a contraction part), a part $\gamma$ that is formed with an approximately constant narrow width (hereinafter, referred to as a retention part), and a part $\lambda$ that is formed such that the distance becomes slightly smaller (hereinafter, referred to as a cooling part). Thereby, a distance among the clips 36, 36 . . . guided by the guide rails $38\alpha$ to $38\lambda$ slightly becomes large in the heating part $\alpha$, gradually becomes small in the contraction part $\beta$, and retained at a constant distance in the retention part $\gamma$, and becomes slightly small in the cooling part $\lambda$.

Figure 3:
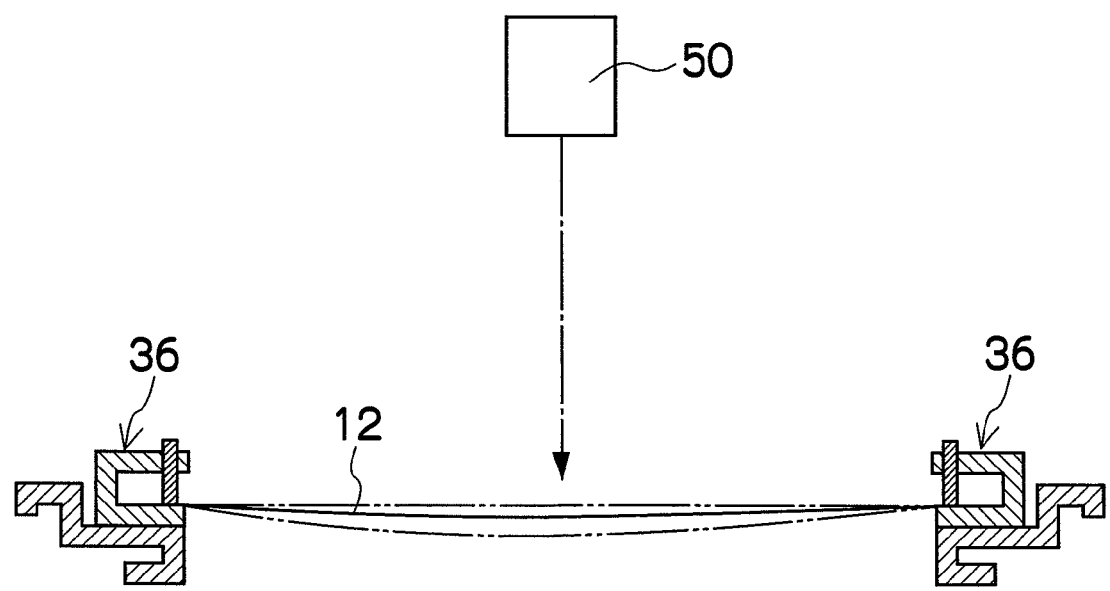
FIG. 3 is a sectional view showing the heat treatment unit at a position of a laser displacement meter.

As shown in FIG. 2, a plurality of laser displacement meters 50 are provided in the heat treatment apparatus. The plurality of laser displacement meters 50, 50 . . . are disposed at a predetermined distance in the direction of transferring the film 12, each laser displacement meter 50 is disposed at the center of the film 12 in the width direction. As shown in FIG. 3, a laser displacement meter 50 is installed in an upper part of the film 12, and configured to radiate a laser toward the lower part. A height position of the center of the film 50 is measured contactlessly by this laser displacement meter 50. Accordingly, a tension state of the film 12 can be determined by a value measured by the laser displacement meter 50, which allows to detect a state where the film 12 loosens in the width direction and the center of the film 12 sags down (in FIG. 3, a state expressed by the two-dots-chain line in the lower side; hereinafter, referred to as a sagging state) and a state where the film 12 is excessively tensed in the width direction (in FIG. 3, a state expressed by the two-dots-chain line in the upper side; hereinafter, referred to as a tensed state).

Figure 4:
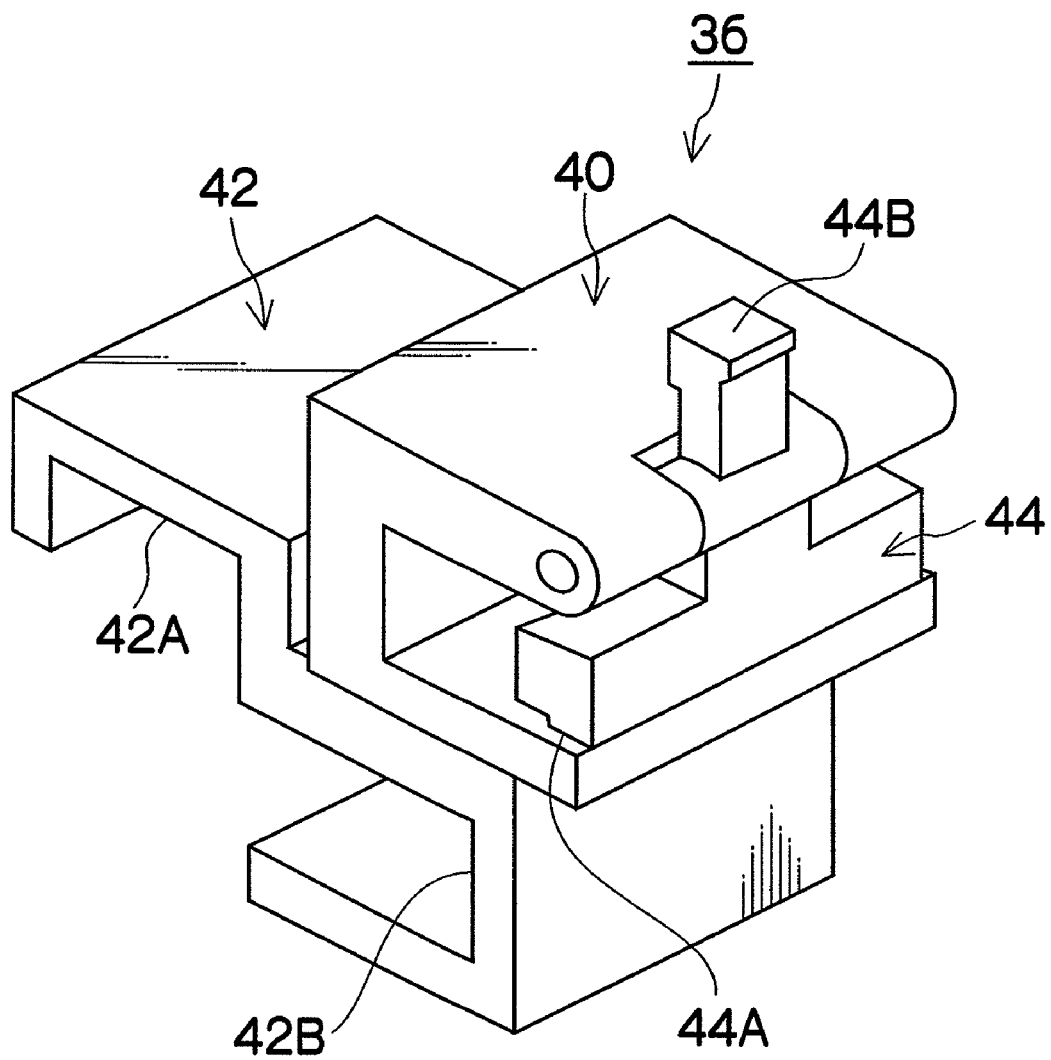
FIG. 4 is a perspective view showing a clip.
Figure 5:
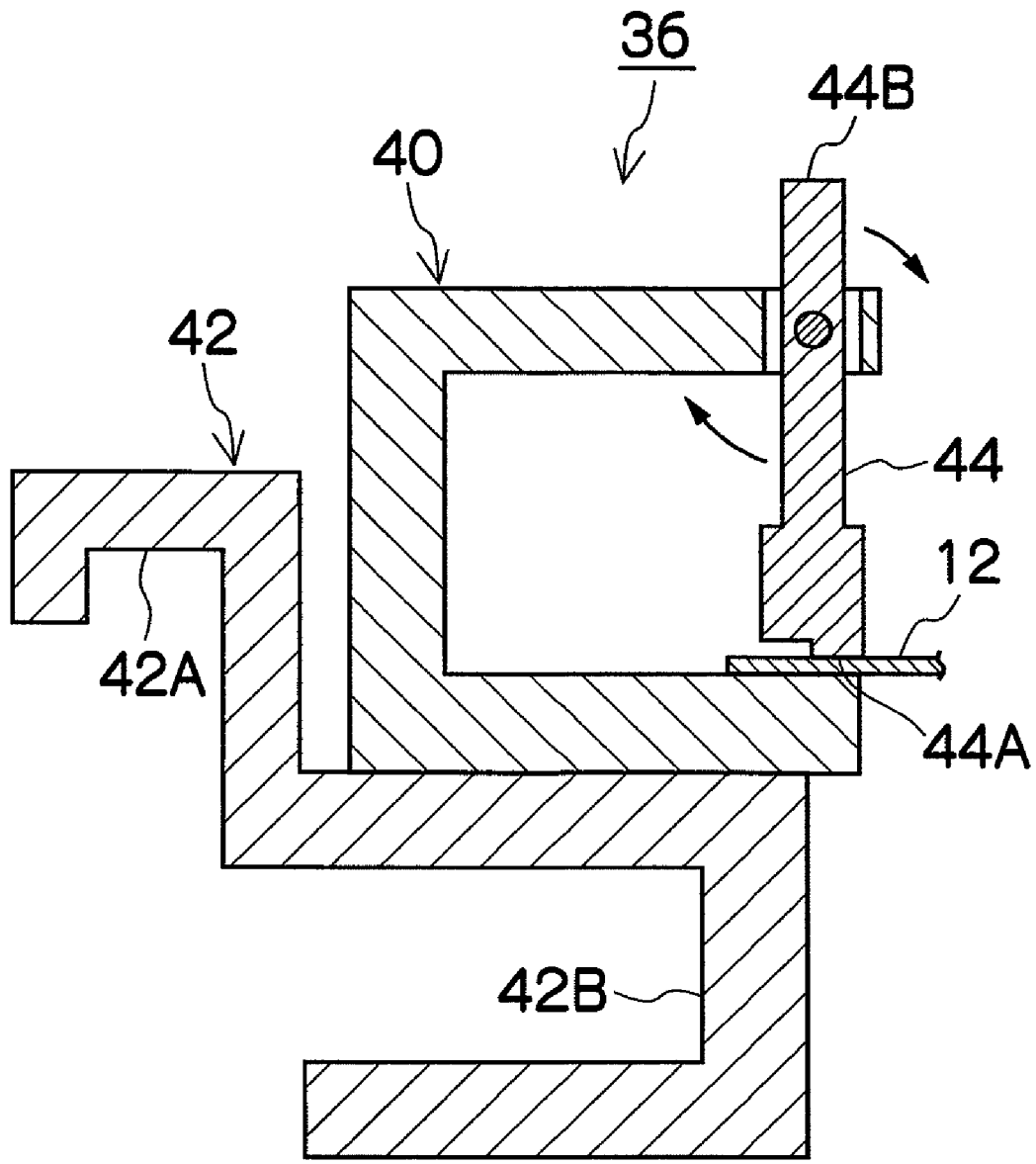
FIG. 5 is a vertical sectional view showing the clip.

FIG. 4 illustrates a perspective view showing the clip 36, and FIG. 5 illustrates a sectional view thereof. As show in these figures, the clip 36 is mainly constituted by a main body 40 and a pedestal 42. The pedestal 42 is formed with an attaching part 42A to which the chain 32 can be attached and a guide part 42B that is guided by the guide rails $38\alpha$ to $38\lambda$. The guide part 42B is engaged with the guide rails $38\alpha$ to $38\lambda$, thereby moving the pedestal 42 along the guide rails $38\alpha$ to $38\lambda$.

A flapper 44 is installed to the main body 40 with a shaft in a freely rotating manner. The flapper 44 has a hedge part 44A in its lower edge, and can hold the edge of the film 12 by pinching the edge between this hedge part 44A and the main body 40. A driving lever 44B is formed in the upper edge of the flapper 44, and the driving lever 44B is pressed in a lateral direction by a guide not shown in the figure, and thereby the flapper 44 is oscillated. The guide is provided at a position of each sprocket 34, 35, and the flapper 44 is oscillated at this position, thereby switching between holding of the film 12 by the hedge part 44A and release of the holding state. Specifically, at a position of the sprocket 34 provided in the upstream side in the direction of transferring the film 12, the clip 36 holds the edge of the film 12, and the clip 36 is transferred to a position of the sprocket 35 in the downstream side with its holding state, and the clip 36 releases the state of holding the film 12 at the position of the sprocket 35 in the downstream side. Accordingly, the film 12 is held with its both edges at the position of the sprocket 34 in the upstream side and the holding is left at the position of the sprocket 35 in the downstream side.

The above described guide rails $38\alpha$ to $38\lambda$ are separately disposed at the heating part $\alpha$, the contraction part $\beta$, the retention part $\gamma$, and the cooling part $\lambda$, as shown in FIG. 2. These guide rails $38\alpha$ to $38\lambda$ are respectively supported in the width direction of the film 12 in a manner of freely sliding and freely adjusting an angle. For example, the guide rail $38\alpha$ is connected in a freely rotating manner to rods $54\alpha$ and $54\alpha$ of cylinders $52\alpha$ and $52\alpha$ provided in an inner side of the width direction of the film 12. Accordingly, the guide rail $38\alpha$ can be moved in parallel in the width direction of the film 12 by two of the cylinders $52\alpha$ and $52\alpha$ being synchronized to drive, and an angle of the guide rail $38\alpha$ can be changed by driving the two cylinders $52\alpha$ and $52\alpha$ with different driving forces.

The guide rails $38\beta$, $38\gamma$ and $38\lambda$ are also supported in the same manner. That is, the guide rail $38\beta$ is connected in a freely rotating manner to rods $52\beta$ and $52\beta$ of cylinders $52\beta$ and $52\beta$ provided in an inner side of the width direction of the film 12, and by driving these cylinders $52\beta$ and $52\beta$, parallel movement or angle adjustment of the guide rail $38\beta$ is performed. The guide rail $38\gamma$ is connected in a freely rotating manner to rods $52\gamma$ and $52\gamma$ of cylinders $52\gamma$ and $52\gamma$ provided in an inner side of the width direction of the film 12, and by driving these cylinders $52\gamma$ and $52\gamma$, parallel movement or angle adjustment of the guide rail $38\gamma$ is performed. The guide rail $38\lambda$ is connected in a freely rotating manner to rods $52\lambda$ and $52\lambda$ of cylinders $52\lambda$ and $52\lambda$ provided in an inner side of the width direction of the film 12, and by driving these cylinders $52\lambda$ and $52\lambda$, parallel movement or angle adjustment of the guide rail $38\lambda$ is performed.

The cylinders $52\alpha$ to $52\lambda$ are controlled based on measurement values of the above described laser displacement meters 50. For instance, when the film 12 in the heating part $\alpha$ is determined to be in a sagging state according to a measurement value of the laser displacement meter 50, the cylinders $52\alpha$ and $52\alpha$ are driven so that a distance between the guide rails $38\alpha$ and $38\alpha$ is enlarged. On the other hand, when the film 12 in the heating part $\beta$ is determined to be in a tensed state, the cylinders $52\alpha$ and $52\alpha$ are driven so that a distance between the guide rails $38\alpha$ and $38\alpha$ becomes narrow. In the same manner, according to a sagging state or a tensed state of the film 12 in the contraction part β, the retention part γ and the cooling part λ, the cylinders 52β, 52γ and 52λ are driven. Thereby, the film 12 can be adjusted to a state where the film 12 is not too loosened and also is not added with excess tension. In addition, when the guide rails 38α to 38λ are moved, angles of the guide rails 38α to 38λ may be adjusted so as not to have a bump between each of the guide rails 38α to 38λ. Further, distances of the guide rails 38α to 38λ may be enlarged after loosening the film 12 once in the width direction.

In the heat treatment unit 18 configured as described above, a tension state of the film 12 in the width direction can be controlled to be approximately constant by adjusting the distances formed by the guide rails 38α to 38λ. That is, when the film 12 is subjected to a heat treatment, and expanded and contracted in the width direction, the distances formed by the guide rails 38α to 38λ are adjusted according to the expansion and contraction amount, and thus a tension state of the film 12 can be controlled to be approximately constant.

Figure 6:
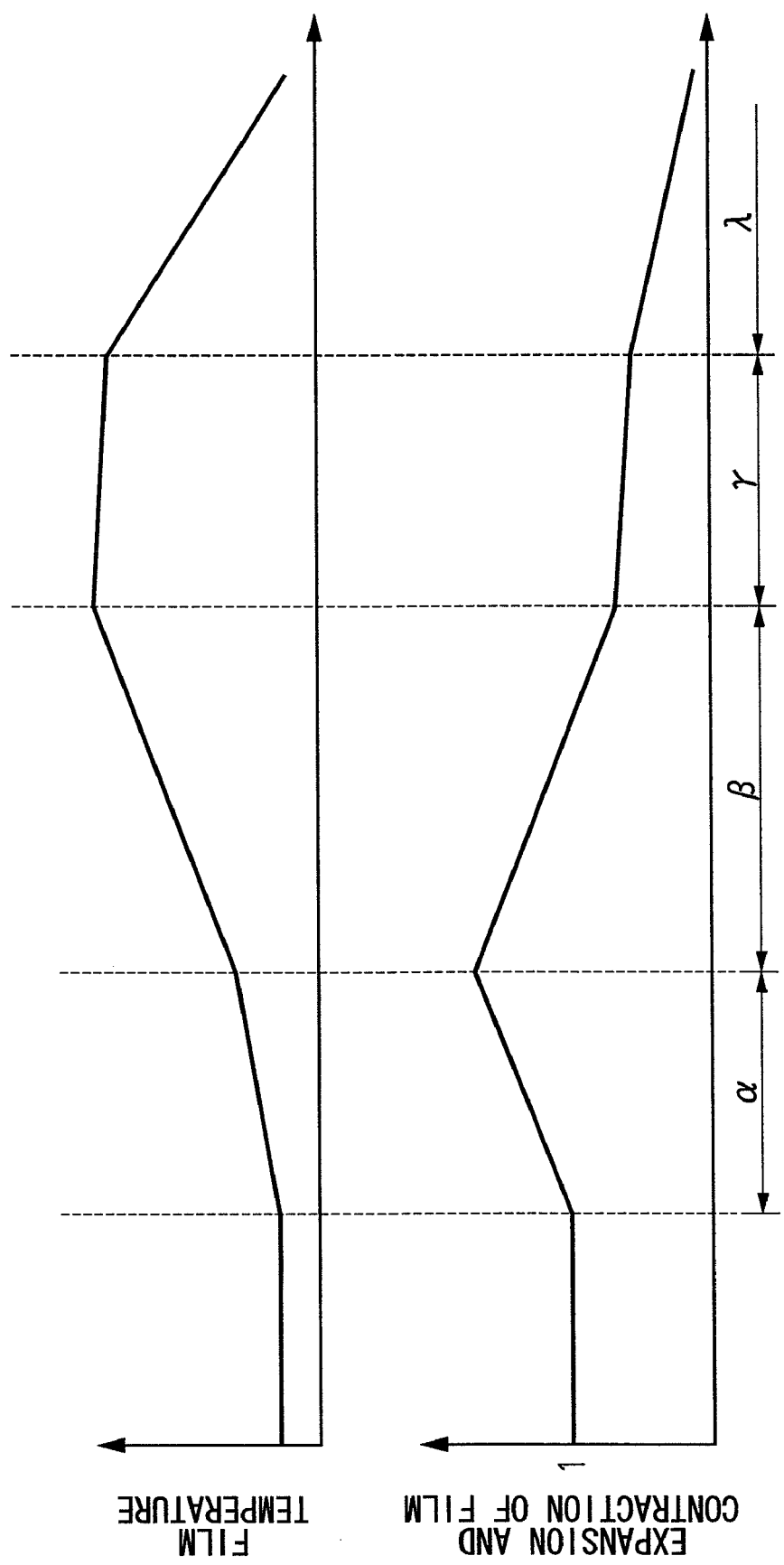
FIG. 6 is a diagram explaining action of the heat treatment unit of the present invention.

FIG. 6 illustrates a diagram showing a relationship between a temperature of the film 12 and an expansion and contraction amount, and the expansion and contraction amount of the film 12 is based on a width of the film 12 before heating as 1.

As shown in the figure, the film 12 is heated in the heating part α(to a level at which crystallization does not occur inside of the film 12), and a temperature of the film 12 is gradually increased. Thus, along with increase of the temperature, the film 12 is expanded in the width direction. Accordingly, in the heating part α, a distance between the guide rails 38α and 38α is adjusted so as to gradually enlarge toward the downstream side in the direction of transferring the film 12. Therefore, the film 12 can be kept in a tensed state at a tension of approximately zero without loosening the film 12.

In the contraction part β, the film 12 is heated around at a level of crystallization. According to the heating, crystallization occurs inside of the film 12, and the film 12 is thus contracted in the width direction. Accordingly, in the contraction part β, a distance between the guide rails 38β and 38β is adjusted so as to gradually become narrow toward the downstream side in the direction of transferring the film 12.

In the retention part γ, the temperature of the film 12 is kept approximately constant, and a dimension of the film 12 is almost not changed in the width direction. Accordingly, in the retention part γ, the guide rails 38γ and 38γ are adjusted so as to be approximately parallel.

In the cooling part λ, the film 12 is cooled, and the temperature of the film 12 gradually decreases. Accordingly, in the cooling part λ, a distance between the guide rails 38λ and 38λ is adjusted so as to gradually become narrow.

The distances between the guide rails 38 and 38 are adjusted as described above, thereby the film 12 is not loosened and is pulled in its edges by the clips 36 and 36, and is kept in a state where a tension thereof is approximately zero. By performing a heat treatment with keeping such a state, the film 12 without variability of optical characteristics can be produced.

In the above described embodiment, the guide rails 38 and 38 are divided into four parts, and a distance of each of the guide rails 38α to 38λ is adjusted, but the number of parts to be divided is not limited thereto, and the guide rails 38 may be divided into 5 or more, or 3 or less. Alternatively, the guide rail 38 on the whole without dividing may be slid in the width direction of the film 12.

Figure 7:
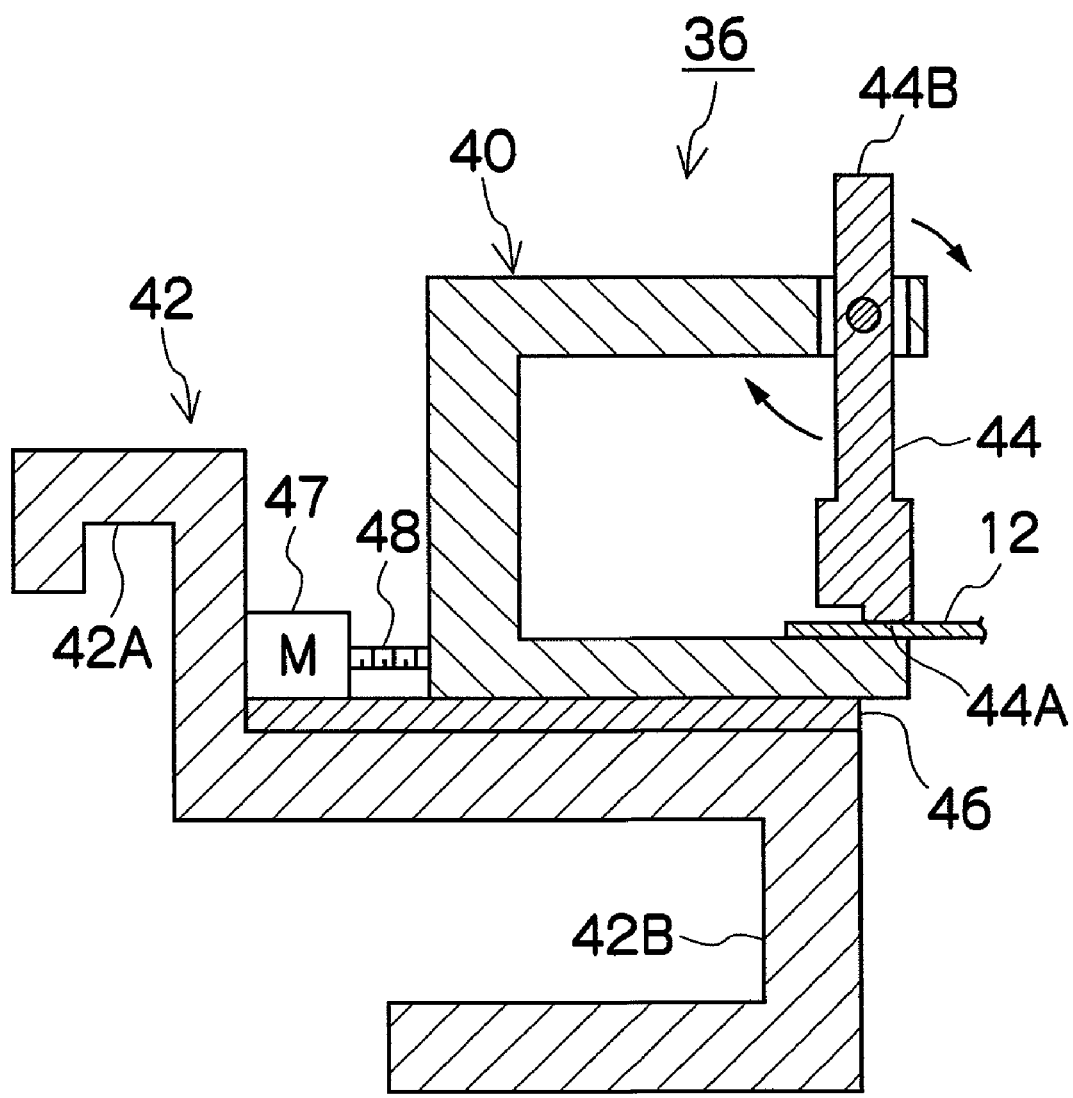
FIG. 7 is a vertical sectional view showing a clip having a structure different from FIG. 4.

In the above described embodiment, a tension state of the film 12 is adjusted by adjusting the distances between the guide rails 38 and 38, but a method of adjusting the tension state of the film 12 is not limited thereto, and for example, as shown in FIG. 7, an adjustment mechanism of the tension state of the film 12 may be provided in the clip 36 itself. The main body 40 of the clip 36 shown in FIG. 7 is attached to the pedestal 42 via a rail 46. The rail 46 is disposed in the width direction of the film 12, and the main body 40 is slided along with the rail 46 in a state that the edge of the film 12 is held by the main body 40, thereby adjusting the tension state (tension) of the film 12 in the width direction.

A driving device configured with a motor 47 and a sending screw 48 is provided in the clip 36 shown in FIG. 7, and by this driving device, the main body 40 can be moved in the width direction of the film 12. That is, the sending screw 48 is supported in a freely rotating manner by the pedestal 42, and the sending screw 48 is provided in the width direction of the film 12 and is screwed in a screw hole (not shown in the figure) formed in the main body 40. The sending screw 48 is connected to the motor 47 and is rotationally driven by this motor 47. Accordingly, the main body 40 is moved in the width direction of the film 12 by driving the motor 47, and thus a tension state of the film 12 in the width direction can be adjusted.

When the above described clip 36 is used, it is preferred to configure so that a controlling signal is sent and received contactlessly with the infrared ray, etc. That is, a receiving part (not shown in the figure) for receiving the controlling signal may be provided on the pedestal 42 and a plurality of sending parts 56, 56 . . . for sending the controlling signal to the receiving part may be provided near the guide rail 38, as shown in FIG. 8. Each sending part 56 is provided in each side of the film 12 in the width direction for each laser displacement meter 50, and the sending part 56 can send the controlling signal to the receiving part in the clip 36 passing through near this sending part 56. Accordingly, when a tension state of the film 12 is detected by the laser displacement meter 50, the controlling signal is output from the sending parts 49 provided in its both sides, and the main body 40 of the clip 36 running near the sending parts 49 is moved in the width direction of the film 12. Thereby, a tension state of the film 12 retained by the main body 40 of the clip 36 is adjusted.

In the above described embodiments, a tension state of the film 12 is measured by the laser displacement meter 50, but a method of detecting the tension state of the film 12 is not limited thereto, and for example, an examiner may determine by visual observation directly or through an observation image.

Further, in the above described embodiments, a tension state of the film 12 is detected and the tension state is adjusted, but the tension state of the film 12 may be adjusted by detecting a temperature of the film 12 and finding an expansion and contraction amount of the film 12 according to the temperature.

A cellulose acylate film 12 having Rth/Re of 0.5 or less is produced by the above explained stretching and heat treatment apparatus 10. In the stretching and heat treatment apparatus 10, the film 12 is retained so that a tension of the film 12 is retained to be approximately zero in the heat treatment unit 18, and thus the cellulose acylate film 12 after production can be prevented from generating variability of optical characteristics, and the cellulose acylate film 12 with high quality can be produced.

The above described cellulose acylate film (hereinafter, symbols are abbreviated) preferably has a single layer structure. Herein, a film having the "single layer structure" means a single cellulose acylate film that is not such a film on which a plurality of film materials are laminated or a coating layer is applied on the surface. A case of producing a single cellulose acylate film from a plurality of cellulose acylate solutions using a sequential flow casting method and a co-casting method is also included. In this case, a cellulose acylate film having a distribution in a thickness direction can be obtained by suitably adjusting a kind and an amount of an additive, a molecular weigh distribution of cellulose acylate, a kind of cellulose acylate, etc. Further, such a cellulose acylate film include a film having various functional units such as an optical anisotropic part, an anti-glaring part, a gas barrier part, an anti-moisture part, etc. in a single film.

[Surface Treatment]

A surface treatment is suitably performed on the cellulose acylate film of the present invention, thereby allowing the film to improve adhesion to various functional layers (for example, an undercoating layer, a backing layer, and an optical anisotropic layer). The surface treatment includes a glow discharge treatment, ultraviolet radiation treatment, corona treatment, firing treatment, and saponification treatment (acid saponification treatment and alkali saponification treatment), and particularly, a glow discharge treatment and an alkali saponification treatment are preferable. The "glow discharge treatment" referred to herein indicates a treatment of performing a plasma treatment on the film surface in the presence of a plasma activating gas. Details about these surface treatment methods are described in journal of technical disclosure by the Japan Institute of Invention and Innovation (technical disclosure No. 2001-1745, issued on Mar. 15, 2001, Japan Institute of Invention and Innovation), and these techniques can be suitably used.

In order to improve adhesion between the film surface and the functional layers, in addition to or in place of the surface treatment, an undercoating layer (adhesion layer) can be provided on the cellulose acylate film of the present invention. There is a description regarding the undercoating layer in journal of technical disclosure by the Japan Institute of Invention and Innovation (technical disclosure No. 2001-1745, issued on Mar. 15, 2001, Japan Institute of Invention and Innovation) on page 32, and these can be suitably used. Further, there is also a description regarding the functional layers provided on the cellulose acylate film of the present invention in journal of technical disclosure by the Japan Institute of Invention and Innovation (technical disclosure No. 2001-1745, issued on Mar. 15, 2001, Japan Institute of Invention and Innovation), pp 32 to 45, and these functional layers described therein can be suitably used.

<<Optical Compensation Film>>

The cellulose acylate film of the present invention can be also used as an optical compensation film. The "optical compensation film" means an optical material having optical anisotropy, which is generally used in a display device such as a liquid crystal display device, and is synonymous with a retardation film, a retardation plate, an optical compensation film, an optical compensation sheet, etc. In a liquid crystal display device, an optical compensation film is used for purposes of improving contrast of a display image and improving visual angle characteristics or color tone.

The cellulose acylate film of the present invention can be directly used as an optical compensation film. Further, a plurality of the cellulose acylate films of the present invention are laminated or the cellulose acylate film of the present invention and films other then the present invention are laminated so that the Re and Rth are suitably adjusted, and the obtained film can be used as an optical compensation film. Such lamination of films can be preformed by using a tackifier or an adhesive agent.

Depending on a case, the cellulose acylate film of the present invention is used as a support of an optical compensation film and an optical anisotropic layer made of liquid crystal is provided thereon, and the obtained film can be also used as an optical compensation film. An optical anisotropic layer applied to the optical compensation film of the present invention may be, for example, formed from a composition containing a liquid crystal compound, or formed from a cellulose acylate film having birefringence.

The liquid crystal compound is preferably a discotic liquid crystal compound or a columnar liquid crystal compound.

[Discotic Liquid Crystal Compound]

Examples of discotic liquid crystal compounds which can be used as the liquid crystal compound in the present invention include compounds described in various references (e.g. C. Destradeetal., Mol. Crysr. Liq. Cryst., Vol. 71, page 111 (1981); Chemical Society of Japan, Quarterly Chemical Reviews, No. 22, Chemistry of Liquid Crystal, Chap. 5, Chap. 10 Sec. 2 (1994); B. Kohne et al., Angew. Chem. Soc. Chem. Comm., page 1794 (1985); and J. Zhang et al., J. Am. Chem. Soc., Vol. 116, page 2655 (1994)).

In the above described optical anisotropic layer, discotic liquid crystal molecules are preferably fixed in an orientated state, and most preferably fixed by a polymerization reaction. Polymerization of the discotic liquid crystal molecules is described in Japanese Patent Application Laid-Open No. 8-27284. In order to fix the discotic liquid crystal molecules, it is required that a polymerizing group be connected as a functional group to a discotic core of the discotic liquid crystal molecule. However, if the polymerizing group is directly connected to the discotic core, it becomes hard to maintain an orientated state in a polymerization reaction. Therefore, a connecting group is introduced between the discotic core and the polymerizing group. A discotic liquid crystal molecule having a polymerizing group is disclosed in Japanese Patent Application Laid-Open No. 2001-4387.

[Columnar Liquid Crystal Compound]

Examples of columnar liquid crystal compounds which can be used as the liquid crystal compound in the present invention include azomethenes, azoxys, cyanobiphenyls, cyanophenyl esters, benzoic esters, cyclohexanecarboxylic phenyl esters, cyanophenyl cyclohexanes, cyano-substituted phenylpyrimidines, alkoxy-substituted phenylpyrimidines, phenyl dioxanes, tolanes, and alkenylcyclohexylbenzonitriles. In addition, not only the above described low molecular weight liquid crystal compounds, high molecular weight liquid crystal compounds can be also used as the columnar liquid crystal compound.

In the above described optical anisotropic layer, columnar liquid crystal molecules are preferably fixed in an orientated state, and most preferably fixed by a polymerization reaction. Examples of columnar liquid crystal compounds which can be used in the present invention include compounds described in, for example, Makrotnol. Chem. Vol. 190, page 2255 (1989); Advanced Materials, Vol. 5, page 107 (1993); U.S. Pat. Nos. 4,683,327; 5,622,648; 5,770,107; pamphlets of WO Nos. 95/22586; 95/24455; 97/00600; 98/23580; 98/52905; Japanese Patent Application Laid-Open Nos. 1-272551; 6-16616; 7-110469; 11-80081; and 2001-328973.

(Optical Anisotropic Layer Made of Polymer Film)

The optical anisotropic layer may be formed from a polymer film. The polymer film can be formed from a polymer capable of exhibiting optical anisotropy. Examples of polymers capable of exhibiting optical anisotropy include polyolefin (e.g. polyethylene, polypropylene, norbornene polymers), polycarbonate, polyallylate, polysulfone, polyvinyl alcohol, polymathacrylic acid ester, polyacrylic acid ester, and cellulose ester (e.g. cellulose triacetate, cellulose diacetate). In addition, a copolymer or a polymer mixture of these polymers may be used as the polymer.

<<Polarizing Plate>>

The cellulose acylate film or the optical compensation film of the present invention can be used as a protective film of a polarizing plate (the polarizing plate of the present invention). The polarizing plate of the present invention is formed from a polarizing membrane and two paralyzing plate-protective films (cellulose acylate films) for protecting both surfaces of the polarizing membrane, and the cellulose acylate film or the optical compensation film of the present invention can be used for at least one of the polarizing plate-protective films. The cellulose acylate film of the present invention can be pasted together with the polarizing membrane by roll to roll, using an adhesive agent.

When the cellulose acylate film of the present invention is used as the above described polarizing plate-protective film, the cellulose acylate film of the present invention is preferably subjected to the above described surface treatment (also described in Japanese Patent Application Laid-Open Nos. 6-94915 and 6-118232) to be hydrophilicized, and it is preferred to perform, for example, a glow discharge treatment, a corona discharge treatment, or an alkali saponification treatment, particularly an alkali saponification treatment is most preferably used as the surface treatment.

As the polarizing membrane, for example, a polyvinyl alcohol film immersed in an iodine solution and stretched can be used. When a polarizing membrane obtained from a polyvinyl alcohol film immersed in an iodine solution and stretched, a surface treated surface of the cellulose acylate film of the present invention can be directly laminated on both surfaces of the polarizing membrane by using an adhesive agent. In the production method of the present invention, preferably, the cellulose acylate film is directly laminated with the polarizing membrane as described above. As the adhesive agent, examples such as an aqueous solution of polyvinyl alcohol or polyvinylacetal (e.g. polyvinylbutyral), and a latex of a vinyl polymer (e.g. polybutyl acrylate) can be used. A particularly preferable adhesive agent is an aqueous solution of a complete saponified polyvinyl alcohol.

In general, since a liquid crystal cell is provided between two polarizing plates in a liquid crystal display device, the device has four polarizing plate-protective films. The cellulose acylate film of the present invention can be favorably used as any of the four polarizing plate-protective films. Particularly, it is preferred that the cellulose acylate film of the present invention be used as a protective film on an outer side, which is not provided between a polarizing membrane and a liquid crystal layer (liquid crystal cell) in the liquid crystal display device, and in this case, a transparent hard coat layer, an anti-glaring layer, and an anti-reflection layer, etc. can be provided.

<<Liquid Crystal Display Device>>

The cellulose acylate film, the optical compensation film and the polarizing plate of the present invention can be used in a liquid crystal display device with various display modes. The cellulose acylate film and the optical compensation film of the present invention have low moisture permeability, and this moisture permeability does not increase when exposed under heat and humidity, and therefore, decrease of a polarizing degree can be suppressed in a polarizing plate using the films for a long period of time. Accordingly, a liquid crystal display device with high reliability can be provided.

Each liquid crystal mode in which these films are used will be described in the following. These liquid crystal display devices may be any of transmissive type, reflective type, and semi-transmissive type.

(TN Mode Liquid Crystal Display Device)

The cellulose acylate film of the present invention can be used as a support of an optical compensation film in a TN mode liquid crystal display device having a TN mode liquid crystal cell. A TN mode liquid crystal cell and a TN mode liquid crystal display device have been well known from a long time ago. An optical compensation film used in the TN mode liquid crystal display device is described in, in addition to Japanese Patent Application Laid-Open Nos. 3-9325, 6-148429, 8-50206, and 9-26572, research papers by Mori et al. (Jpn. J. Appl. Phys. Vol. 36 (1997) p. 143, and Jpn. J. Appl. Phys. Vol. 36 (1997) p. 1068).

(STN Mode Liquid Crystal Display Device)

The cellulose acylate film of the present invention may be used as a support of an optical compensation film in an STN mode liquid crystal display device having an STN mode liquid crystal cell. Generally, in an STN mode liquid crystal display device, columnar liquid crystal molecules in a liquid crystal cell are twisted within the range from 90 to 360 degrees, and a product (Δnd) of a reflective index anisotropy (Δn) of the columnar liquid crystal molecules by a cell gap (d) is within the range from 300 to 1500 nm. An optical compensation film used in an STN mode liquid crystal display device is described in Japanese Patent Application Laid-Open No. 2000-105316.

(VA Mode Liquid Crystal Display Device)

The cellulose acylate film of the present invention can be used as an optical compensation film in a VA mode liquid crystal display device having a VA mode liquid crystal cell and a support of the optical compensation film. The VA mode liquid crystal display device may be in a multi domain alignment mode as described in, for example, Japanese Patent Application Laid-Open No. 10-123576.

(IPS Mode Liquid Crystal Display Device and ECB Mode Liquid Crystal Display Device)

The cellulose acylate film of the present invention is advantageously used particularly as an optical compensation film in an IPS mode liquid crystal display device and an ECB mode liquid crystal display device having an IPS mode and EBC mode liquid crystal cell and a support of the optical compensation film, or a protective film of a polarizing plate. These modes are states in which liquid crystal materials are aligned approximately in parallel at the time of displaying a black image, liquid crystal molecules are aligned in parallel to a base plate surface with no voltage applied to display a black image.

(OCB Mode Liquid Crystal Display Device and Han Mode Liquid Crystal Display Device)

The cellulose acylate film of the present invention is also advantageously used as a support of an optical compensation film in an OCB mode liquid crystal display device having an OCB mode liquid crystal cell or an HAN mode liquid crystal display device having an HAN mode liquid crystal cell. In an optical compensation film used in the OCB mode liquid crystal display device or the HAN mode liquid crystal display device, preferably, a direction having a minimum absolute value of a retardation does not exist in plane and a normal line direction of the optical compensation film. Optical properties of the optical compensation film used in the OCB mode liquid crystal display device or the HAN mode liquid crystal display device are determined by optical properties of an optical anisotropic layer, optical properties of a support, and disposition of the optical anisotropic layer and the support. An optical compensation film used in the OCB mode liquid crystal display device or the HAN mode liquid crystal display device is described in Japanese Patent Application Laid-Open No. 9-197397. There is also a description in a research paper by Mori et al. (Jpn. J. Appl. Phys. Vol. 38 (1999) p. 2837).

(Reflective Liquid Crystal Display Device)

The cellulose acylate film of the present invention is also advantageously used as an optical compensation film in TN mode, STN mode, HAN mode, and GH (Guest-Host) mode reflective liquid crystal display devices.

These display modes have been well known since a long time ago. A TN mode reflective crystal liquid display device is described in Japanese Patent Application Laid-Open No. 10-123478, a pamphlet of WO98/48320, and Japanese Patent No. 3022477. An optical compensation film of the reflective crystal liquid display device is described in a pamphlet of WO00/65384.

(Other Crystal Liquid Display Devices)

The cellulose acylate film of the present invention is advantageously used as a support of an optical compensation film in an ASM (Axially Symmetric Aligned Microcell) mode liquid crystal display device having an ASM mode liquid crystal cell. The ASM mode liquid crystal cell is characterized in that a cell thickness is maintained by a resin spacer capable of adjusting a position. Other properties are the same as a TN mode liquid crystal cell. The ASM mode liquid crystal cell and the ASM liquid crystal display device are described in a research paper by Kume et al. (SID98 Digest1O89 (1998)).

<<Hard Coat Film, Anti-Glaring Film, Anti-Reflection Film>>

The cellulose acylate film of the present invention may be applied to a hard coat film, an anti-glaring film, and an anti-reflection film. For the purpose of improving visibility of flat panel displays such as LCD, PDP, CRT, EL, any of or all of a hard coat layer, an anti-glaring layer and an anti-reflection layer can be given to one surface or both surfaces of the cellulose acylate film of the present invention. A desirable embodiment of such an anti-glaring layer and anti-reflection layer is described in detail in journal of technical disclosure by the Japan Institute of Invention and Innovation (technical disclosure No. 2001-1745, issued on Mar. 15, 2001, Japan Institute of Invention and Innovation) on pp. 54 to 57, and can be preferably used in the cellulose acylate film of the present invention.

EXAMPLES

As a film before stretching, a FUJITAC film (thickness: 80 μm, Tg: 140° C., Tm: 295° C., made by FUJIFILM Corporation) was used. This film before stretching was subjected to a heat treatment under heat treatment conditions (a maximum heat treatment temperature, film tension adjustment, temperature increasing rate) shown in the table in FIG. 9. In this example, the film tension was adjusted by: (a) enlarging a guide rail distance while watching sag of the film in a distance adjusting part of the guide rail in the width direction, and ceasing at the point of time when the film does not sag; (b) enlarging further 10% from the state in the above description (a); and (c) contracting 10% from the state in the above description (a).

Quality of a film product obtained through the above described heat treatment was evaluated by variability of optical characteristics in the width direction, bowing, and a surface state. Results of the evaluation are shown in FIG. 9. In the table in FIG. 9, the variability of optical characteristics in the width direction was evaluated as "very good": unevenness of retardation in the film width direction is within ±5 nm, and thus the film can be favorably used as a retardation film; "good": unevenness of retardation in the film width direction is +10 nm, thus the film is in a level to be used as a retardation film; and "poor": unevenness of retardation in the film width direction is +10 nm or more, and the film can not be used as a retardation film. The bowing was evaluated as "very good": variability of an optical slow axis direction in the film width direction is within ±0.5°, and thus the film can be favorably used as a retardation film; "good": variability of an optical slow axis direction in the film width direction is within ±1°, and thus the film can be favorably used as a retardation film; "normal": variability of an optical slow axis direction in the film width direction is within ±1.5°, and the film is in level to be used as a retardation film without problems; and "poor": variability of an optical slow axis direction in the film width direction is more than ±1.5°, and the film cannot be used as a retardation film. The surface state was evaluated as "very good": no wrinkle and tinplate-like unevenness are observed in film appearance; "good": subtle wrinkle is observed in the edge of the film width direction, and subtitle tinplate-like unevenness is observed on the whole film surface, but the film is in a level to be used as a retardation film without problems; and "poor": large tinplate-like unevenness is observed on the whole film surface, and thus the film cannot be used as a retardation film.

As obvious from the table in FIG. 9, in Comparative Example 1 wherein excess tension was given to the film, sufficient quality could not be obtained with respect to variability of optical characteristics in the width direction and bowing. Further, in Comparative Example 2 wherein the film is too loosened, sufficient quality could not be obtained with respect to variability of optical characteristics in the width direction and surface state. Contrary to these, Examples 1 to 4 of the present application, wherein the film is retained in a state of having suitable tension, sufficient quality was obtained with all respects to variability of optical characteristics in the width direction, bowing and surface state.

Among Examples 1 to 4, in Example 2 having a temperature increasing rate exceeding 150° C., a film was in a level to be used as a product without problems, but bowing was caused. In Example 3 having a temperature increasing rate of less than 50° C., a film with high quality in view of bowing could be obtained, but productivity thereof was poor.

As shown in Example 4 and Comparative Example 3, when a maximum heat treatment temperature is less than Tg, a film without problems as a product could be produced. Accordingly, in the present invention, effects can be obtained particularly when the maximum heat treatment temperature is Tg or more.

What is claimed is:

1. A heat treatment method of a thermoplastic resin film, comprising:
   running a strip shaped thermoplastic resin film in a longitudinal direction; and
   heating the thermoplastic resin film in a state that the both edges of the film in a width direction are held with holding members to conduct a heat treatment, wherein
   a distance between the holding members is changed depending on an expansion/contraction amount of the thermoplastic resin film in the width direction; and wherein the thermoplastic film is a cellulose acylate film having a degree of acetyl substitution of from 2.70 to 2.87.

2. The heat treatment method of a thermoplastic resin film according to claim 1, wherein when a glass transition temperature of the thermoplastic resin film is Tg (°C.), and a melting point of the thermoplastic resin film is Tm°C., a maximum temperature Tmax (°C.) of the thermoplastic resin film in the heat treatment satisfies Tg≦Tmax <Tm.

3. The heat treatment method of a thermoplastic resin film according to claim 1, wherein a temperature increasing rate to reach the maximum temperature Tmax (°C.) of the thermoplastic resin film is 50 (°C./min) or more and 150 (°C./min) or less.

4. The heat treatment method of a thermoplastic resin film according to claim 2, wherein a temperature increasing rate to reach the maximum temperature Tmax (°C.) of the thermoplastic resin film is 50 (°C./min) or more and 150 (°C./min) or less.

* * * * *